United States Patent [19]

Shuster

[11] 4,276,074

[45] Jun. 30, 1981

[54] FLUID REPLACEMENT SYSTEM FOR HYDRAULIC ACTUATORS FOR GLASS SHEET SHAPING MOLDS AND METHOD OF PRESS BENDING GLASS SHEETS

[75] Inventor: James S. Shuster, Leechburg, Pa.

[73] Assignee: PPG Industries, Inc., Pittsburgh, Pa.

[21] Appl. No.: 75,386

[22] Filed: Sep. 13, 1979

[51] Int. Cl.³ .............................................. C03B 23/03
[52] U.S. Cl. ...................................... 65/106; 65/273; 65/287; 60/456
[58] Field of Search ................. 65/106, 273, 268, 285, 65/287, 107; 60/456

[56] References Cited

U.S. PATENT DOCUMENTS

| | | | |
|---|---|---|---|
| 840,876 | 1/1907 | Steedman . | |
| 2,683,347 | 7/1954 | Abdo | 60/456 X |
| 3,000,357 | 9/1961 | Geyer . | |
| 3,059,416 | 10/1962 | Campbell | 60/456 X |
| 3,294,516 | 12/1966 | Carson et al. | 65/273 |
| 3,425,574 | 2/1969 | Willgrubs et al. | 60/456 X |
| 4,073,311 | 2/1978 | McGeachy | 137/513.3 |
| 4,119,427 | 10/1978 | Revells | 65/159 |

Primary Examiner—Arthur D. Kellogg
Attorney, Agent, or Firm—Donald Carl Lepiane; Edward I. Mates

[57] ABSTRACT

Hydraulic fluid actuated pistons are operatively connected to shaping molds used to shape glass sheets by moving the molds between a glass-engaging position and a retracted position. The piston is movably mounted within a piston cylinder to form two chambers. Hydraulic fluid is applied under pressure alternately to one or the other chamber to actuate movement of the piston and the glass sheet shaping mold connected to the piston. When hydraulic fluid is applied under pressure, it tends to become heated to a temperature at which the hydraulic fluid carbonizes and/or foams. Either of these occurrences reduces the efficiency of the hydraulic fluid to actuate uniform piston motion. Means is provided to insure that hot hydraulic fluid removed from one of the chambers is delivered to the upper portion of a storage reservoir where it is cooled before it is returned to the piston cylinder from the lower portion of the storage reservoir, thereby insuring a continuous supply of cold hydraulic fluid for piston actuation.

7 Claims, 3 Drawing Figures

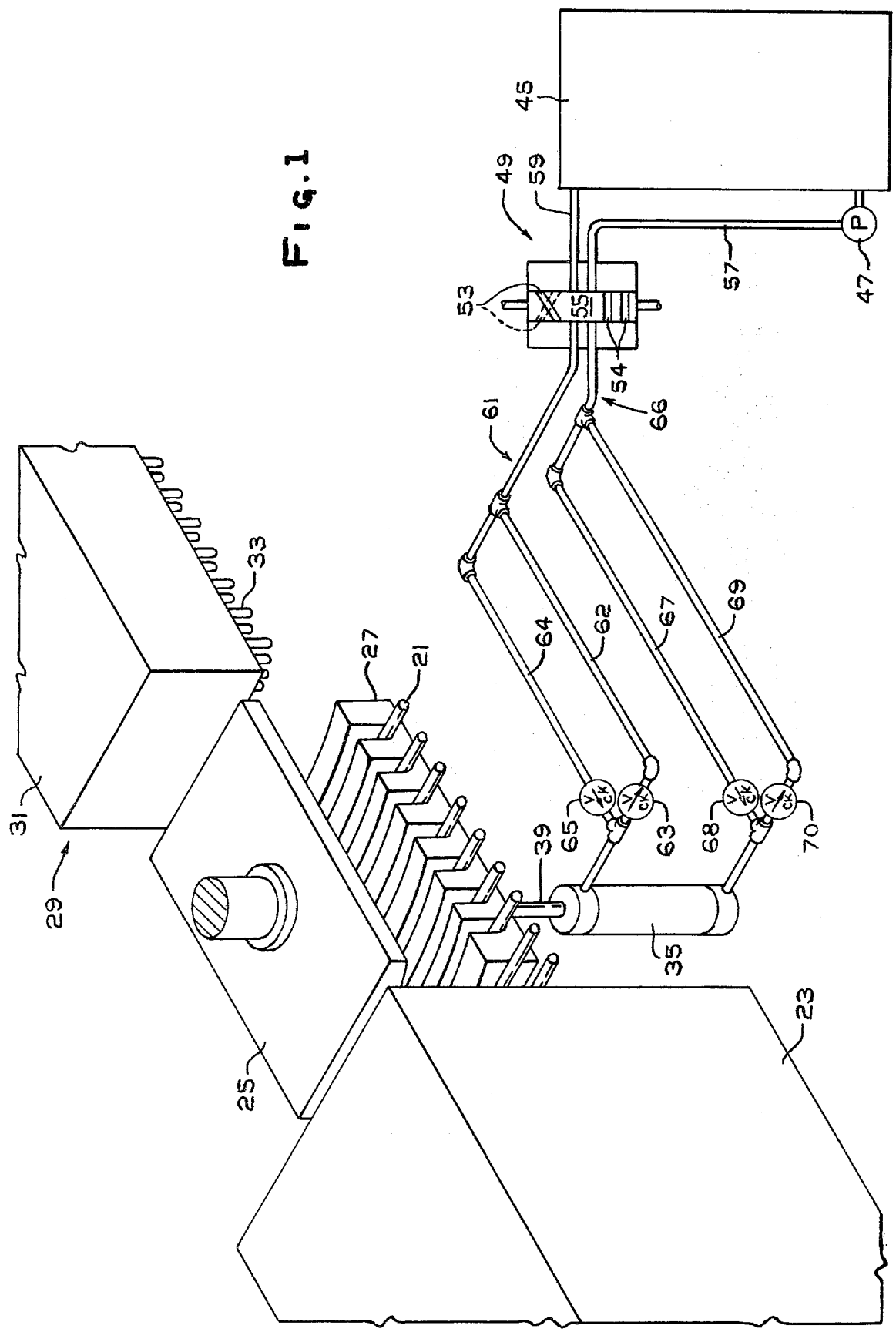

FLUID REPLACEMENT SYSTEM FOR HYDRAULIC ACTUATORS FOR GLASS SHEET SHAPING MOLDS AND METHOD OF PRESS BENDING GLASS SHEETS

BACKGROUND OF THE INVENTION

1. Field of the Invention

The present invention relates to the shaping of glass sheets, and particularly to hydraulic fluid actuated pistons which are used to actuate movement of glass sheet shaping molds having a shaping surface of predetermined configuration for movement between a glass-engaging position to change the shape of a heat-softened glass sheet, and a retracted position to permit the mold to await the arrival of a glass sheet into a position where it can be engaged by the moving shaping mold. In mass production operation, it is necessary that the mold movement is smooth and of controlled speed from cycle to cycle so as to insure uniform application of pressure against the heat-softened glass sheet so as to insure that each glass sheet which is shaped in turn is shaped to a curvature that conforms as uniformly as possible to the shape imparted to every other glass sheet in a series of glass sheets shaped in a mass production operation.

Typically, a hydraulically operated piston divides a piston cylinder into two chambers and hydraulic fluid is applied under pressure alternately to each of the opposite chambers and simultaneously removed from the other chamber. Prior to the present invention, the hydraulic fluid removed from one of the chambers was fed directly into the other chamber and as a result, the hydraulic fluid tended to become hot. The hot hydraulic fluid tended to carbonize and also to foam or bubble. Such factors cause the hydraulic fluid to operate haphazardly instead of uniformly and steadily, thereby resulting in non-uniform operation of the piston. It was difficult, if not impossible, to coordinate the movement of the shaping mold with the introduction of a heat-softened glass sheet into a glass sheet shaping station where the shaping mold moved in response to actuation by the piston operating with hot hydraulic fluid from a retracted position into a glass-engaging position to impart a desired shape to the glass sheet. It was therefore desirable to develop a technique that would insure better uniformity of operation of glass sheet shaping molds than the haphazard and unpredictable operation of mold movement actuated by pistons whose cylinders contain hot hydraulic fluid that incorporated foam and/or carbon particles resulting from its heating during mass production bending operations.

2. Description of Patents of Interest

U.S. Pat. No. 840,876 to Steedman discloses a hydraulic system for double acting piston actuators which have regulated lines for one-way flow of branch lines into and out of chambers on both sides of the piston within the piston cylinder. However, the double flow lines are used for pressure regulation and not for cooling purposes.

U.S. Pat. No. 3,000,357 to Geyer discloses a high temperature hydraulic actuator assembly which is proposed to avoid the necessity of continuously circulating hydraulic fluid through parts exposed to ambient temperatures in the range of 1000° F. to cool hydraulically operated actuators at such elevated temperatures. Differential pressure is applied through both the extend valves and the retract valves to permit oil to be continuously circulated whenever the hydraulic actuator is operated in a high temperature environment, thus providing a cooling effect.

U.S. Pat. No. 3,294,516 to Carson et al discloses a hydraulic system for actuating movement of a glass sheet bending mold. Reservoirs are provided with the hydraulic supply system. However, no mention is made of any technique for cooling the hydraulic fluid in this patent.

U.S. Pat. No. 4,073,311 to McGeachy discloses a bi-directional valve for unrestricted flow in one direction and a regulatable restriction for flow control in the other direction which includes control valves permitting hydraulic fluid movement in one or the other direction. The control lines are used for pressure regulation annd not cooling purposes in this patent.

U.S. Pat. No. 4,119,427 to Revells discloses a hydraulic system for controlling the operation of a piston which controls the vertical movement of a glass sheet shaping mold. Means is provided to store hydraulic fluid. However, no mention is made of cooling the hydraulic fluid in this patent.

SUMMARY OF THE INVENTION

The present invention incorporates means to supply hydraulic fluid to one of the chambers on one side of a piston within a piston cylinder while simultaneously removing hydraulic fluid from the other side of the piston in response to movement of said piston within said piston cylinder in such a manner that the hydraulic fluid portion removed from said piston cylinder is prevented from re-entering the piston cylinder until after it has been directed to the upper portion of a hydraulic fluid storage reservoir. The hydraulic fluid portion, after being cooled in said hydraulic fluid storage reservoir, is reapplied from the lower portion of the storage reservoir to said piston cylinder. Also, the hydraulic fluid transfer system between the piston cylinder and the storage reservoir has a small capacity compared to those of an intermediate capacity piston cylinder and a large capacity storage reservoir. The hydraulic fluid that is heated by compression within the cylinder is not supplied to the hydraulic piston cylinder without being cooled between its successive uses. Under such circumstances the hydraulic fluid is maintained at a temperature lower than that at which it carbonizes or foams. As a result, the operation of the shaping mold whose movement is actuated by the piston is more uniform from cycle to cycle, thereby insuring a more efficient and more uniform glass sheet shaping operation.

The various benefits of the present invention will be understood more clearly in the light of a description of a preferred embodiment thereof that follows.

BRIEF DESCRIPTION OF THE DRAWINGS

In the drawings that form part of a description of the preferred embodiment of the present invention and wherein like reference numbers refer to like structural elements, FIG. 1 is a fragmentary, schematic view of a hydraulic fluid supply system for a piston showing how a piston cylinder operatively connected to a glass sheet shaping mold located between a glass sheet heating furnace and a cooling area is provided with cool hydraulic fluid for each stroke of the piston according to the present invention;

DESCRIPTION OF THE PREFERRED EMBODIMENT

Figure 3:
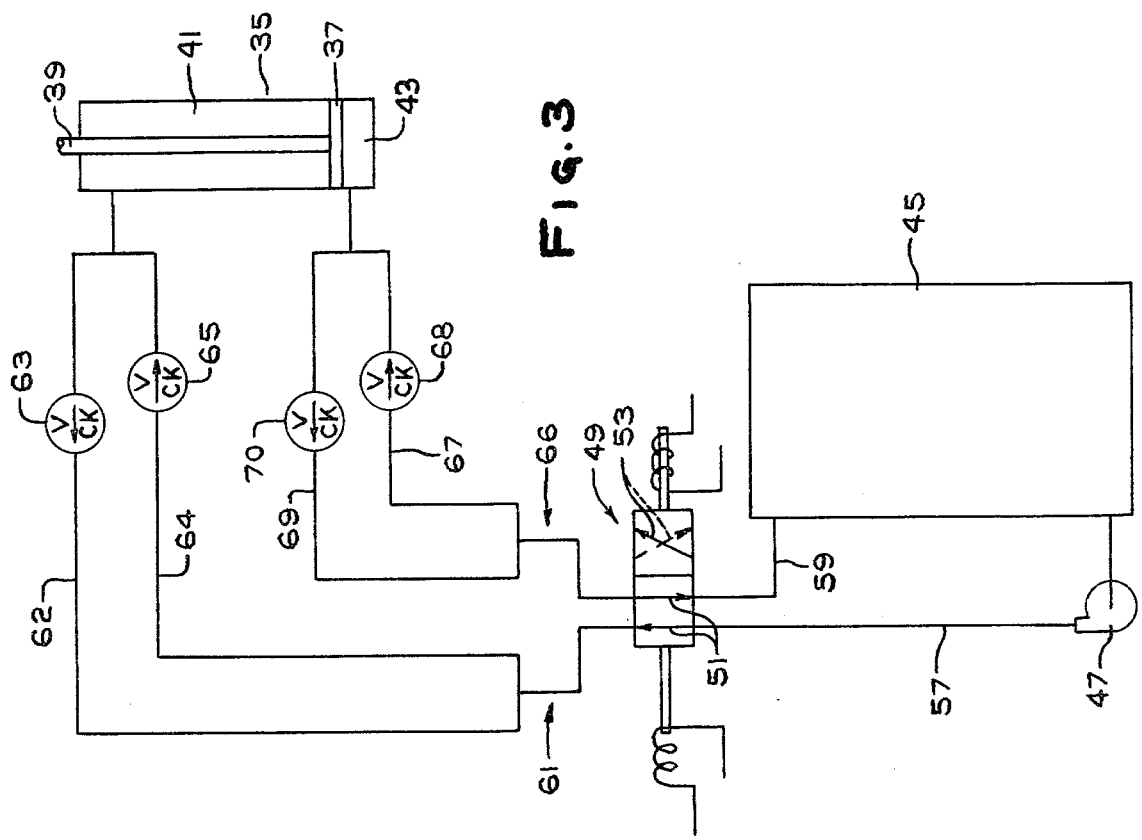
FIG. 3 is a schematic view similar to FIG. 2 showing how the various elements of the hydraulic fluid supply system of the present invention are disposed during the positioning of a glass sheet shaping mold in a retracted position.

While the preferred embodiment discloses a piston actuating vertical movement of a shaping mold for engaging and disengaging glass sheets supported for movement in a substantially horizontal plane, it is understood that the present invention may be used in conjunction with any piston actuated shaping member that is used to engage glass sheets supported in any orientation while heat-softened in order to impart a shape to the glass.

Referring to FIG. 1 of the drawings, the environment for a particular embodiment of the present invention comprises a conveyor incorporating conveyor rolls 21 that extend transversely of a path through a furnace 23 and a shaping station that comprises an upper vacuum mold 25 and a lower shaping mold 27. The lower shaping mold is movable between a retracted position (not shown) and a glass-engaging postion wherein the lower shaping mold 27 is lifted into a position where its upper shaping surface of desired configuration is above the plane of support provided by the longitudinally spaced transversely extending conveyor rolls 21. The apparatus also comprises a cooling area 29 beyond the shaping station occupied by the upper vacuum mold 25 and the lower shaping mold 27. The cooling area 29 incorporates upper and lower plenum chambers 31, only the upper one of which is shown, and provided with a plurality of nozzles 33 arranged in rows and columns to impart air under pressure against the opposite surfaces of a glass sheet in the manner well-known in the art. The apparatus is part of that disclosed in U.S. Pat. No. 4,092,141 to Robert G. Frank and Dewitt W. Lampman. Further structural details which do not form part of the details of the present invention may be obtained from a study of the aforementioned patent, and additional details are incorporated herein by reference.

The gist of the present invention involves means for actuating movement of the lower shaping mold 27 between a retracted position wherein the upper shaping surface of the mold is below the plane of glass sheet support provided by the conveyor rolls 21 and an upper glass-engaging position which the mold occupies above the conveyor rolls 21 as depicted in FIG. 1. The gist of the invention is the control system for a piston cylinder 35 having a piston 37 (see FIGS. 2 and 3) slidably movable therewithin. A piston rod 39 rigidly interconnects the piston 37 with the base of the lower shaping mold 27 so that the lower shapinng mold is lifted or lowered in response to movement of the piston 37 within the piston cylinder 35.

The piston 37 separates the piston cylinder 35 into a first or lowering chamber 41 to one side of the piston 37 and a second or lifting chamber 43 to the other side of the piston. Means is provided for alternately supplying hydraulic fluid under pressure to the second chamber 43 to lift the piston so as to raise the lower shaping mold into glass-engaging position when a glass sheet is in alignment thereover so as to shape a heat-softened glass sheet to a desired curvature and means for also supplying hydraulic fluid into the first chamber 41 so as to lower the piston 37, its piston rod 39 and its connected shaping mold 27 to a recessed position to await the arrival of a subsequent glass sheet.

Figure 2:
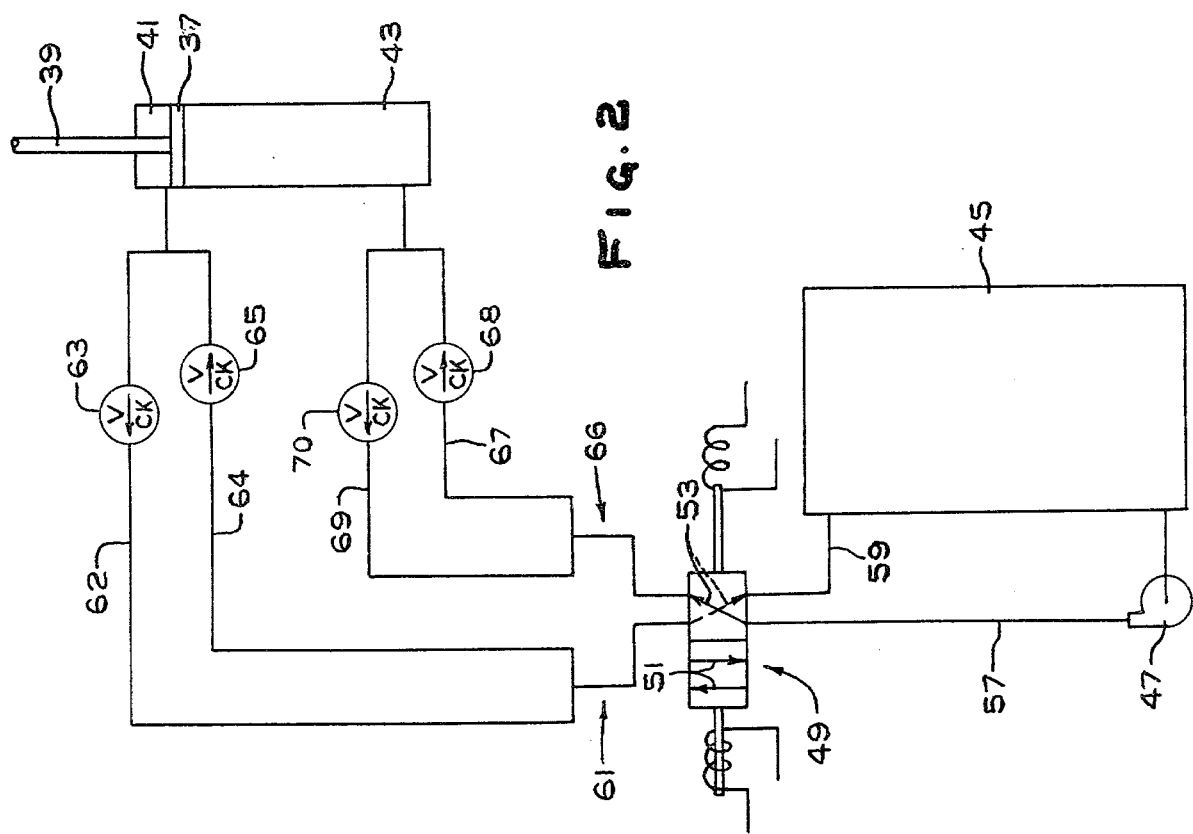
FIG. 2 is a schematic view of an alternate embodiment of the system of FIG. 1, showing how the control elements of the system for supplying hydraulic fluid are disposed when the piston is actuated to move the glass sheet shaping mold into a glass sheet engaging position.

Hydraulic fluid is stored in a storage reservoir 45. The hydraulic fluid supply system according to the present invention includes a pump 47 and a main control valve 49 which may either be a three position valve as depicted in FIG. 1 or a two position valve as depicted in FIGS. 2 and 3. The main control valve 49 is capable of occupying a first position in which a pair of parallel ports 51 occupy a hydraulic fluid transmitting position or a second position wherein a pair of criss-crossing ports 53 occupy an operative position for the main control valve 49. If desired, the main control valve 49 may be provided with a neutral hold position 55 which inhibits any movement of hydraulic fluid through the main control valve 49 whatsoever.

The pump 47 is located in the path of a first pipe 57 to communicate between the storage reservoir 45 and the main control valve 49. A second pipe 59 also communicates between the main control valve 49 and the storage reservoir 45 in a downward direction.

The apparatus further includes first hydraulic fluid transfer means 61 which comprises an exhaust branch line 62 for the first chamber 41 comprising a one-way evacuation check valve 63 therein and a supply branch line 64 for the first chamber 41 that includes a one-way supply check valve 65. The apparatus also includes a second hydraulic fluid transfer means 66 which comprises a supply branch line 67 for the second chamber 43 including a one-way supply check valve 68 and an exhaust branch line 69 for the second chamber 43 that includes a one-way exhaust check valve 70.

The various branch lines and check valves are constructed and arranged relative to the main control valve 49 in such a manner that when it is desired to raise the shaping mold 27 by lifting piston 37, hydraulic fluid is applied under pressure from the storage reservoir 45 through the pump 47 and the first pipe 57 through the main control valve 49 set to couple the first pipe 57 with the second hydraulic fluid transfer means 66. This enables hydraulic fluid under pressure to be redelivered through the supply branch line 67 for the second chamber 43 through the supply valve 68 while the exhaust valve 70 prevents any hydraulic fluid previously removed from the second chamber 43 through branch line 69 to be redelivered to the second chamber 43 through the branch line 69. As the piston 37 is lifted in response to additional hydraulic fluid being supplied to the second chamber 43, fluid which is heated as a result of its being compressed in the first chamber 41 is forced to return to the storage reservoir 45 through the evacuation branch line 62 via one-way exhaust check valve 63. The hydraulic fluid that is exhausted from the first chamber 41 during the lifting of the lower shaping mold 27 is delivered through the first hydraulic fluid transfer means 61 to the second pipe 59 and then into the storage reservoir 45 through the main control valve 49 that is appropriately set to provide the proper communication.

It is noted that in FIG. 1, the parallel ports 51 raise the lower shaping mold 27 whereas in FIGS. 2 and 3, the main control valve 49 is arranged for the criss-crossing ports 53 to be in the operative position to cause the hydraulic fluid to lift the piston 37 within the piston cylinder 35. Either arrangement of main control valve setting is acceptable as long as branch 62 in the first hydraulic fluid transfer means 61 is in its hydraulic fluid evacuation set up and the second hydraulic fluid transfer means 66 communicates to the second chamber through the one-way supply check valve 68 simultaneously for raising the piston 35 and the other operative setting of the main control valve 49 insures simultaneous application of hydraulic fluid to the first chamber 41 via branch line 64 containing one way supply valve 65 and its removal from the second chamber 43 through exhaust line 69 containing one way exhaust valve 70. This system insures that the hydraulic fluid is delivered through the main control valve 49 to the storage reservoir 45 and is prevented from returning directly to the piston cylinder 35 from one of the piston cylinder chambers 41 or 43 regardless of whether it is delivered through the same chamber from which it is evacuated or the other chamber until such time as the hydraulic fluid has had an opportunity to return to the storage reservoir 45.

During the time that the lower shaping mold 27 is in its glass-engaging position as depicted in FIG. 1, the main control valve may be shifted to a neutral position provided only in the FIG. 1 embodiment to maintain the mold in the glass-engaging position until such time as the shaped glass sheet has been transferred to the upper vacuum mold 25 and supported thereon by vacuum. At this time, it is necessary to retract the lower shaping mold 27. The main control valve 49 is now moved into a position wherein the first pipe 57 communicates with the first hydraulic fluid transfer means 61 and the second pipe 59 communicates with the second hydraulic fluid transfer means 66. Thus, hydraulic fluid pumped through the first pipe 57 by pump 47 is now forced into the first hydraulic fluid transfer means 61 and then through supply branch line 64 through supply check valve 65 into the first chamber 41 to lower the piston 37 and force the excess hydraulic fluid from the second chamber 43 into the exhaust branch 69 through the one-way exhaust check valve 70 of the second hydraulic fluid transfer means and then into the second pipe 59 to the storage reservoir 45. The one-way supply check valve 68 in supply branch line 67 prevents the hydraulic fluid from returning directly to supply branch line 67. Therefore, the hydraulic fluid removed from the second chamber 43, by virtue of the movement of the piston 37 in response to the hydraulic fluid being supplied into the first chamber 41, is forced to be delivered into the storage reservoir 45.

While the hydraulic fluid is being stored in the storage reservoir 45, it is cooled. Two ways of cooling may be provided or either one of the two cooling methods may be used. In one of the cooling methods, the volume of hydraulic fluid that is stored within the storage reservoir 45 is considerably greater than the amount of hydraulic fluid that is supplied within the piston cylinder 35 and its supply pipes so that the hot hydraulic fluid that is forced out of the piston cylinder 35 is mixed with a relatively large volume of relatively cold hydraulic fluid within the storage reservoir 45, thereby lowering its temperature. If desired, heat exchangers may be provided within the storage reservoir. Closed pipes of cold water or other liquid having a high heat transfer characteristic may be employed to lower the supply of hydraulic fluid within the storage reservoir 45 and enable the fluid that is supplied to the piston cylinder 35 in time for the next operative movement of the lower shaping mold 27 to be sufficiently cool so that the heating that takes place during the pressurization of the hydraulic fluid is not accompanied by a rise in temperature sufficient to cause the hydraulic fluid to either carbonize and/or foam.

The present invention provides a simple supply system for providing hydraulic fluid in such a manner that it is cooled between successive deliveries to one or the other chambers of the piston cylinder 35 during the movement of the piston 37. All hydraulic fluid removed through exhaust branch lines 62 or 69 and valve 49 to the second pipe 59 falls to the upper portion of the storage reservoir 45 where it drops by gravity onto the hydraulic fluid stored therein. All hydraulic fluid delivered to supply branch lines 64 and 67 is transmitted through the first pipe 57 from the bottom portion of the storage reservoir 45, which insures that only cool hydraulic fluid is delivered to the supply branch lines for delivery to the piston cylinder 35.

The relative capacity of the piston cylinder 35 is preferably more than twice the total capacity of the hydraulic fluid transfer means 61 or 66 to insure that at any one stroke of the piston, a majority of the exhausted hydraulic fluid is delivered to the storage reservoir 45 and a minority of the exhausted hydraulic fluid remains in one of the fluid transfer means 61 or 66. These relative dimensions also insure that a major portion of the hydraulic fluid delivered to the other chamber of piston cylinder 35 is taken from the bottom of the storage reservoir 45 and a minor portion of the delivered hydraulic fluid is taken from the other fluid transfer means 66 or 61. Since the piston 37 is actuated several times in each minute of operation in mass production press bending of glass sheets, the time that the minor portion of the delivered hydraulic fluid is stored in the pipe 57 and one of the fluid transfer means 61 or 66 is so short that the heating effect of the environment on the hydraulic fluid is minor compared to the heating effect due to compression by the piston 37 within the piston cylinder 35. Furthermore, the pipes and branch lines comprising the fluid transfer means may be wrapped in suitable insulation to minimize the heating effect further if such insulation is necessary.

In a specific embodiment of this invention, a piston cylinder having a capacity of about 70 cubic inches (about three times the total capacity of one of the fluid transfer means 61 or 66) was used successfully with a storage reservoir having a capacity of 5 gallons (1155 cubic inches), with hydraulic fluid amounting to at least 10 times the storage capacity of the piston cylinder in the system to maintain the hydraulic fluid below 200° F. with ambient conditions of about 100° F. and no cooler in the storage reservoir.

While each of the chambers 41 and 43 of the piston cylinder 35 is shown provided with a single opening for receiving a common pipe for chamber 41 formed by joining branch lines 62 and 64 and a common pipe for chamber 43 formed by joining branch lines 67 and 69, the branch lines may lead directly into the chambers of the piston cylinder by providing two openings for each chamber. Thus, each of the four branch lines communicates directly with one of the four openings, branch lines 62 and 64 with openings in the first chamber 41 and branch lines 67 and 69 with openings in the second chamber 43.

Every specific embodiment of the present invention has been described for purpose of illustrating the present invention. It is understood that various changes may be made without departing from the gist of the invention as defined by the claimed subject matter that follows.

I claim:
1. In a method of shaping a glass sheet wherein the method includes the steps of heating the sheet to its shaping temperature; positioning the heated sheet between a first pressing mold and a second pressing mold, the first pressing mold having a shaping surface of a predetermined configuration and the second pressing mold having a shaping surface complementary to the shaping surface of the first pressing mold; actuating a piston assembly to move the first pressing mold from a sheet engaging position toward and against the second pressing mold into a sheet pressing position with the sheet therebetween to shape the sheet, the piston assembly having a piston movably mounted within a piston cylinder to divide the cylinder into first and second chambers; and actuating the piston assembly to move the first pressing mold from the sheet pressing position into the sheet engaging position; and the first actuating step is accomplished by moving a hydraulic fluid under pressure into the first chamber to move the piston out of the chamber and moving the hydraulic fluid out of the second chamber while maintaining the fluid in the first chamber under pressure to shape the sheet wherein maintaining the hydraulic fluid under pressure causes heating of the hydraulic fluid which tends to carbonize the fluid which restricts the flow of the fluid and/or causes the fluid to foam which prevents maintaining the hydraulic fluid under constant pressure during pressing of the sheet, and the second actuating step is accomplished by moving hydraulic fluid into the second chamber and out of the first chamber, the improvement comprising the steps of:
moving hydraulic fluid into the second chamber of the piston assembly from lower portion of a reservoir while moving heated hydraulic fluid from the first chamber into top portion of the reservoir during the practice of the second actuating step;
cooling the hydraulic fluid received in the reservoir, said cooling step accomplished by providing a larger volume of fluid in the reservoir than that expected to be exhausted from the piston assembly and conducting heat from the reservoir; and
moving the hydraulic fluid from the second chamber into the top portion of the reservoir while moving cooler hydraulic fluid from the bottom portion of the reservoir into the first chamber during the practice of the first actuating step to prevent carbonizing and/or foaming of the fluid to maintain a constant pressure on the first pressing mold during shaping of the sheet.

2. The method as set forth in claim 1 wherein said cooling step includes mixing the heated hydraulic fluid from the first chamber with cooler hydraulic fluid stored in the reservoir.

3. The method as set forth in claim 1 or 2 wherein said cooling step includes cooling the hydraulic fluid stored in the reservoir by a heat exchanger.

4. The method as set forth in claim 1 wherein said moving heated hydraulic fluid steps are accomplished by moving hydraulic fluid having a volume greater than half the capacity of the piston assembly to the reservoir to insure that the majority of the heated hydraulic fluid from the piston assembly on each stroke of the piston is delivered to the reservoir for cooling.

5. In an apparatus for shaping a sheet wherein the apparatus is of the type having a first pressing mold having a shaping surface of a predetermined configuration; a second pressing mold having a shaping surface complementary to the shaping surface of the first pressing mold and means for moving the first pressing mold between a sheet engaging position and a sheet pressing position wherein the first pressing mold in the sheet pressing position continuously urges the sheet to be shaped between the first and second pressing molds, the moving means includes a piston assembly having a piston mounted in a cylinder to divide the cylinder into first and second chambers; first means for passing hydraulic fluid under pressure into the first chamber and for passing hydraulic fluid out of the second chamber to move the first pressing mold from the sheet engaging position toward and into the sheet pressing position and to maintain the hydraulic fluid under pressure during the pressing of the sheet wherein maintaining the hydraulic fluid under pressure causes heating of the hydraulic fluid which tends to carbonize and/or foam the hydraulic fluid; and second means for passing the hydraulic fluid into the second chamber and for passing the hydraulic fluid out of the first chamber to move the first pressing mold from the sheet pressing position to the sheet engaging position, the improvement comprising:
a reservoir container hydraulic fluid;
means for cooling the hydraulic fluid in said reservoir to maintain the hydraulic fluid in said reservoir below the temperature of incoming hydraulic fluid from the first chamber, said cooling means including a larger volume of fluid in said reservoir than that expected to be exhausted and means for conducting heat from said reservoir;
said first passing means including means for connecting the second chamber of the cylinder to upper portion of said reservoir and for connecting the first chamber of the cylinder to lower portion of said reservoir to move cooler hydraulic fluid into the first chamber to prevent carbonizing and/or foaming of the fluid to maintain a constant pressure on the first pressing mold when the first pressing mold is in the sheet pressing position; and
said second passing means includes means for connecting the first chamber of the cylinder to the upper portion of said reservoir to cool the incoming heated hydraulic fluid and the second chamber of cylinder to the lower portion of said reservoir.

6. The apparatus as set forth in claim 5 wherein said first passing means and second passing means include:
a control valve having four ports and means for interconnecting the first port to the third port and the second port to the fourth port when in a first position and for interconnecting the first port to the fourth port and the second port to the third port when in the second position;
a first pair of branch lines each connected at one end to the first chamber of the cylinder and at the second end to the first port of said valve and a check valve in each line to have opposite fluid flows in said first pair of branch lines;
a second pair of branch lines each connected at one end to the second chamber of the cylinder and at the second end to the second port of said valve and a check valve in each line to have opposite fluid flow in said second pair of branch lines;

pump connected to the third port of said valve and to lower portion of said reservoir;

pipe means connecting upper portion of said reservoir and the fourth port of said valve; and means acting on said interconnecting means for moving said interconnecting means to the second position to move hydraulic fluid from the first chamber of the cylinder to the upper portion of said reservoir and to move hydraulic fluid from the lower portion of said reservoir to the second chamber and for moving said interconnecting means from the second position to the first position to move the hydraulic fluid from the second chamber of the cylinder to the upper portion of the reservoir and to move hydraulic fluid from the lower portion of the reservoir to the first chamber.

7. The apparatus as set forth in claim 6 wherein said check valves of said first and second branch lines are adjacent the cylinder to minimize the amount of hydraulic fluid in said first and second branch lines between said check valves and the cylinder.

* * * * *